(12) United States Patent
Reddy A V et al.

(10) Patent No.: US 11,294,775 B2
(45) Date of Patent: Apr. 5, 2022

(54) SYSTEMS AND METHODS FOR FILE LEVEL PRIORITIZATION DURING DATA BACKUPS

(71) Applicant: EMC IP Holding Company LLC, Hopkinton, MA (US)

(72) Inventors: Mahesh Reddy A V, Bangalore (IN); Swaroop Shankar D H, Bangalore (IN); Chetan Battal, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 226 days.

(21) Appl. No.: 16/805,050

(22) Filed: Feb. 28, 2020

(65) Prior Publication Data

US 2021/0271562 A1 Sep. 2, 2021

(51) Int. Cl.
| | |
|---|---|
| *G06F 12/00* | (2006.01) |
| *G06F 11/14* | (2006.01) |
| *G06F 16/182* | (2019.01) |
| *G06F 17/16* | (2006.01) |
| *G06F 9/54* | (2006.01) |
| *G06F 16/14* | (2019.01) |

(52) U.S. Cl.
CPC ......... *G06F 11/1464* (2013.01); *G06F 9/546* (2013.01); *G06F 11/1451* (2013.01); *G06F 11/1461* (2013.01); *G06F 11/1469* (2013.01); *G06F 16/14* (2019.01); *G06F 16/1824* (2019.01); *G06F 17/16* (2013.01)

(58) Field of Classification Search
CPC ............ G06F 11/1464; G06F 11/1451; G06F 11/1461; G06F 11/1469; G06F 11/1435; G06F 11/3006; G06F 16/1824; G06F 16/14; G06F 9/546; G06F 17/16
See application file for complete search history.

(56) References Cited

PUBLICATIONS

Rao et al. "Weighted Euclidean distance based approach as a multiple attribute decision making method for plant or facility layout design selection" (Year: 2011).*

* cited by examiner

*Primary Examiner* — Shawn X Gu
(74) *Attorney, Agent, or Firm* — Womble Bond Dickinson (US) LLP

(57) ABSTRACT

Methods and systems for file level prioritization during a data backup operation are described. According to some embodiments, the method includes in response to a request to backup one or more files and for each file, sniffing file information of the file. The method further includes determining a backup critical level of the file based on the file information. The method further includes assigning a weighted value corresponding to the backup critical level of the file. The method further includes using the weighted value to calculate a Euclidean distance of the file to a next consecutive file.

21 Claims, 7 Drawing Sheets

SYSTEMS AND METHODS FOR FILE LEVEL PRIORITIZATION DURING DATA BACKUPS

CROSS-REFERENCE TO RELATED APPLICATIONS

This application is related to application Ser. No. 16/805,100, filed Feb. 28, 2020, entitled "SYSTEMS AND METHODS FOR FILE LEVEL PRIORIZATION DURING MULTI-OBJECT DATA RESTORES", the disclosure of which is incorporated herein by reference to the extent it is consistent with this disclosure.

FIELD OF THE INVENTION

Embodiments of the present invention relate generally to data storage systems. More particularly, embodiments of the invention relate to systems and methods for file level prioritization during data backups.

BACKGROUND

In today's world, a large amount of data is processed on the daily basis. As such, data backup plays a vital role to secure one's data. A backup window is critical in day-to-day backup scenarios. In the backup world, backups are prioritized, for example, as P0 (critical), P1 (high), P2 (medium), and P3 (low). Within a specified backup window, choosing a priority among file sets at a source host is an imperative decision. All of the files would be written irrespective of their priorities to a target device as it would not be able to ascertain a priority among the files to be written.

Accordingly, this would become critical when recovery point objective (RPO) is addressed. For instance, RPO of certain clients can be marked as P0 even though the secondary storage treats all backups as normal backups. For customer, RPO factor will come into the picture and they expect P0 backups to be addressed/protected based on priority. Typically, in a time disaster situation if the logic goes by percentage, for example 50% for P0, 30% for P1, and rest for non-critical backups, then the probability of P0 backups being protected is high during the time of disaster scenario.

In conventional data protection scenario in large scale enterprises, which has an abundant file system backup requirement, a backup admin would schedule multiple backups for a distinct file system workload within the enterprise. Apparently, all of the backup jobs would have a schedule in the same window, where the backups would be running in parallel for all of the scheduled data sets. All of the data sets would be routed for backup to the target device.

Conventionally, a backup utility would service a backup request based upon a list of files scheduled by a predefined priority, as decided by the backup admin. However, the files that are (in particular) queued for processing by the backup utility at the source level is based on a first come first serve basis. Because of such unbiased scheduling model, there could be chances where less critical files would be processed first rather than critical files. Consequently, if a disaster occurs, then the critical files can still be in the queue, while non-critical data sets are written to the target device. Hence, there could be possible data loss when a disaster occurs at the same instant of time at the source as well.

For example, in a typical file system backup scenario using a backup application, the end user would employ several jobs that can be scheduled for different clients. There are jobs that are scheduled for a day that run at the same time and from different hosts. This could be for different file system workloads, such as txt files, pdf, word documents, excel worksheets, mp4 files, video files, and so on. Once the backup utility starts to process the files from different clients, there are chances that files, which are less critical such as mp4 files or video files with huge size, might be processed first and the critical files, such as salary slip, lock box files, and excel files which are of low size and high priority, are still waiting in the queue for them to get processed and sent to the target device. In such cases, if the disaster occurs at the source host, then the data loss occurring could prove costly to the customer.

Unfortunately, conventional file system backup solutions do not have any mechanism to prioritize the file system data based on a criticality during a backup. Backup utility has no mechanism to prioritize the file level data sets at the source side that are considered as a backup interest. As a result, if there is a disaster during or before the write operation completes, there can be a resulting data loss that proves costly to the customer. This would also reduce the RPO of the backup application.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
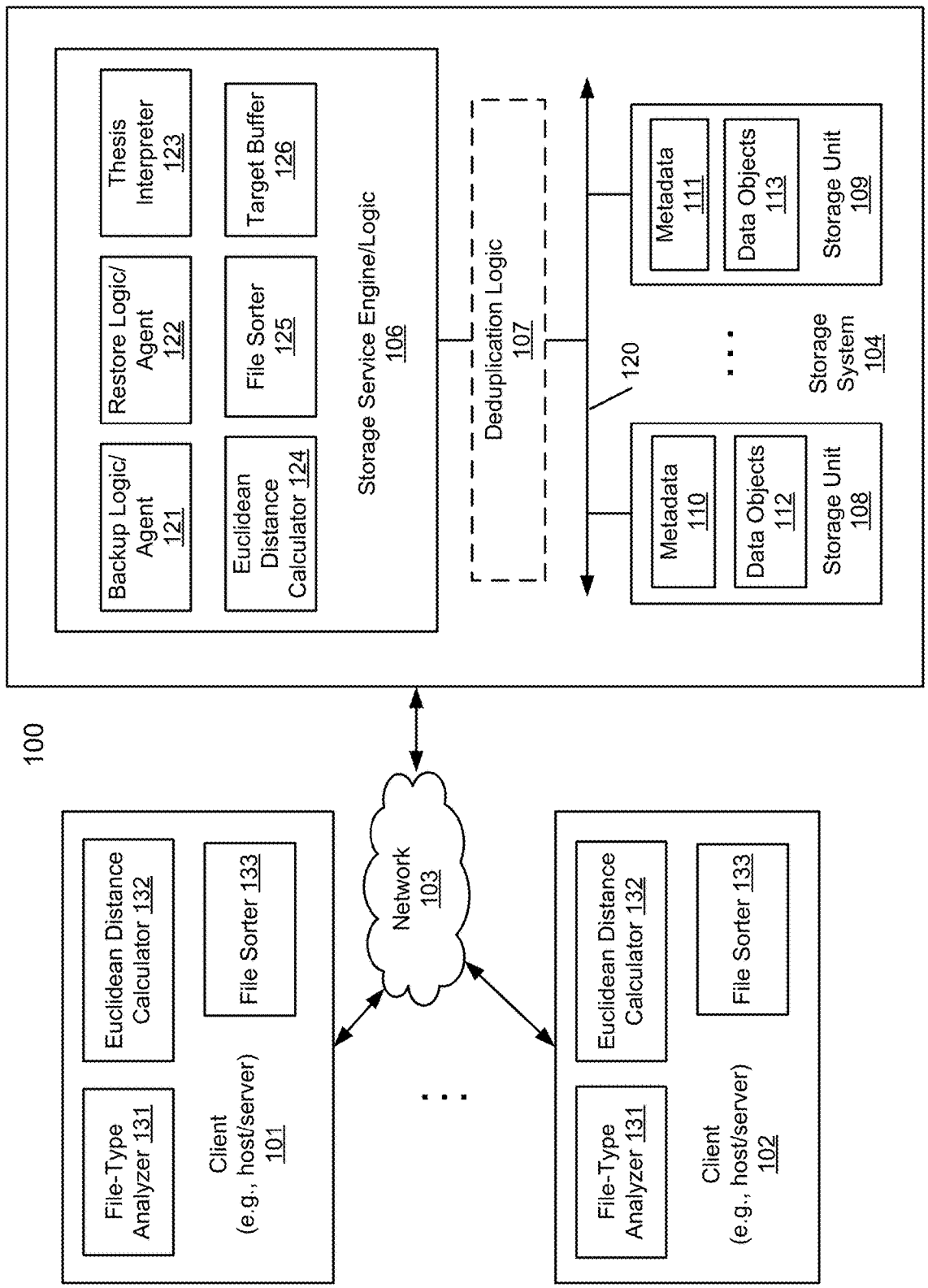
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention disclose a solution to prioritize file level data sets based upon their criticality in order to mitigate the risk of losing the data, for example due to a disaster midway the backup. That is, embodiments of the invention disclose how file sets are prioritized at a source device based on their critical levels.

In some embodiments, the solution uses a weighted value proportional to the criticality of the file system data for prioritization. The criticality of a file system data set is first calculated using a file-type analyzer, priority for a file is determined and the same captured in a thesis file. Also, a Euclidean distance $E_d$ may be calculated for each file at the backup utility's queue. Based upon the Euclidean distance, the file that needs to be serviced first from the queue may be determined or decided before handling it over to the backup utility. In some embodiments, the algorithm works based upon the Euclidean distance along with file-type critical weightage information to prioritize and route the files to a backup utility for service. In some embodiments, a file type is sniffed and its criticality using a file-type analyzer and set the priority at the file level and present that to the backup utility. At the source device, there may be an algorithm that would decide the priority of the files in the queue to be processed by the backup utility. This would serve the critical files first in the queue to be backed up, thereby reducing the possible data loss due to a disaster. In some embodiments, file system workload properties may be relied upon and Euclidean spaces of incoming files may be calculated to decide on the data sets that need immediate attention and to check for any non-critical file types to be skipped for processing by the backup utility.

According to one aspect, a method for file level prioritization during a data backup operation is described. The method includes in response to a request to backup one or more files and for each file, sniffing file information of the file. The method further includes determining a backup critical level of the file based on the file information. The method further includes assigning a weighted value corresponding to the backup critical level of the file. The method further includes using the weighted value to calculate a Euclidean distance of the file to a next consecutive file.

In one embodiment, the method further includes storing the file information and the backup critical level of each file in a thesis file. The method may further include sorting the one or more files based on the calculated Euclidean distance of each file. In one embodiment, to use the weighted value to calculate the Euclidean distance of the file, a dot product of the weighted value and a sequence of the file in a queue is obtained. Also, to sort the one or more files, a nearest and most critical file to be backed up may be selected based on the calculated Euclidean distance of the nearest and most critical file to a current file. The file information may include a file type or a filename. Further, the method may further include backing up the sorted one or more files in accordance with the respective Euclidean distances of the sorted one or more files.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

With continued referenced to FIG. 1, each of clients 101-102 may include a file-type analyzer 131, a Euclidean distance calculator 132, and a file sorter 133 installed thereon. File-type analyzer 131 is configured sniff file details (also referred to as file properties or file information) of each file, for example a file type of the file to be backed up, analyze the filename of the file, and determine or decide a backup criticality (or critical level) of the file (e.g., high, medium, or low). In one embodiment, Euclidean distance calculator 132 is configured to calculate a Euclidean distance of each file and its consecutive file to be backed up. For example, the Euclidean distance may be calculated using a weighted value to obtain a dot product of a priority and a sequence at the queue for that particular file. Based on the calculated Euclidean distance, file sorter 133 is configured to adjust or sort files in the queue by selecting a nearest critical file to be serviced by backup agent 121 (described herein below), which may route latch for a write operation at a target device, such as storage system 104.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121, restore logic 122, thesis interpreter 123, Euclidean distance calculator 124, file sorter 125, and target buffer 126. In one embodiment, thesis interpreter 123, Euclidean distance calculator 124, and file sorter 125 may be part of restore logic 122. In another embodiment, thesis interpreter 123, Euclidean distance calculator 124, and file sorter 125 may be invoked by restore logic 122 or another module/logic/engine.

Backup logic or agent 121 is configured to receive and back up or replicate data from a client (e.g., clients 101-102) and to store the backup data in any one or more of storage units 108-109. Restore logic or agent 122 is configured to retrieve and restore backup data from any one or more of storage units 108-109 back to a client (e.g., clients 101-102). Thesis interpreter 123 is configured to evaluate the priority of each file and present the evaluated priority to Euclidean distance calculator 124. Euclidean distance calculator 124 may calculate a Euclidean distance of each file and its consecutive file to be restored. For example, the Euclidean distance may be calculated using a weighted value from thesis interpreter 123 to obtain a dot product of a priority and a sequence at the queue for that particular file. File sorter 125 may adjust or sort the files in data streams by selecting a nearest critical file to be latched to restore agent 122 based on the Euclidean distance of each file. The adjusted or sorted files may be routed to target buffer 126 (e.g., a read buffer) within the available streams for read operations. Target buffer 126 may route the sorted files to be restore latched and recovered at a target site, such as clients 101-102.

Still referring to FIG. 1, storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks), for example as data objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
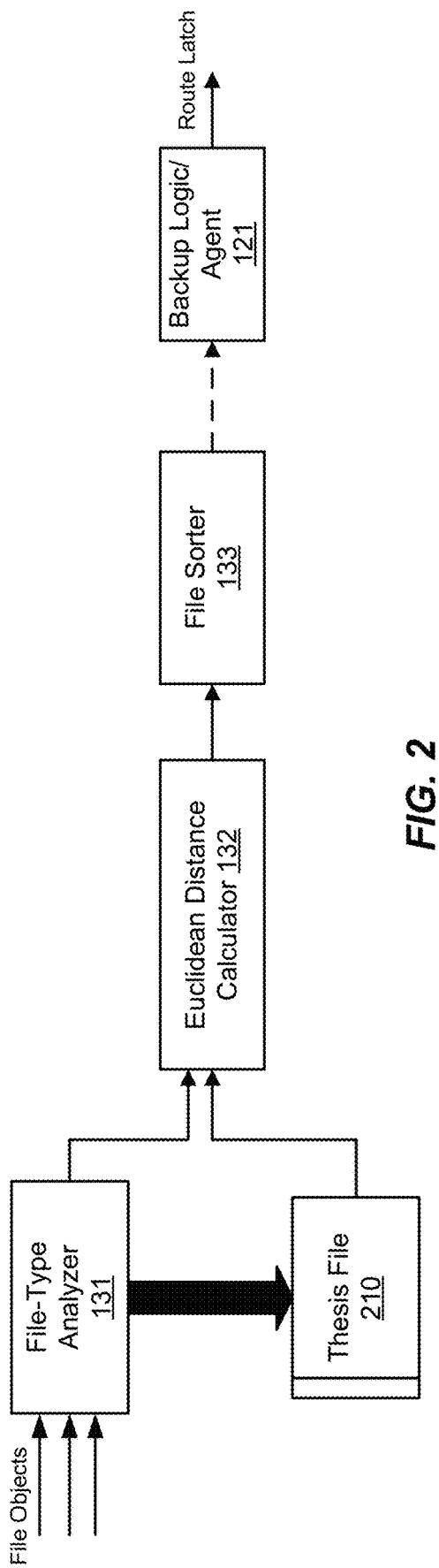
FIG. 2 is a block diagram illustrating a file level data prioritization system according to one embodiment.

FIG. 2 is a block diagram illustrating a file level data prioritization system according to one embodiment. Referring to FIG. 2, the system includes the file-type analyzer 131, Euclidean distance calculator 132, file sorter 133 and backup logic/agent 121, as previously described. At each of clients 101-102, file-type analyzer 131 may sniff (or determine) file details (also referred to as file properties or file information) of each file, for example a file type of the file (or each file object) to be backed up and analyze the filename of the file to decide a backup criticality of the file, such as high, medium, or low. For example, a file type with a .pdf extension (e.g., important/critical documents) may be considered as a high-level criticality, whereas a file type with .mp3 or .mp4 extension (e.g., audio file) may be considered as a low-level criticality. In one embodiment, if the filename matches any of the crucial or critical filename patterns, such as "pay slip", "tax forms", "test plans", etc., then the backup criticality or critical level may be increased to high irrespective of the file type extensions. The reverse may also be true, for example, when the filename matches the least critical patterns, such as "cheat-codes.pdf", "phonenumbers.txt", etc., the backup criticality or critical level may be decreased to medium or low regardless of the file type extensions. The filename and corresponding backup criticality (e.g., high, medium, or low) of each file may be stored in thesis file 210. Thesis file 210 may be stored on a persistent storage device (e.g., hard disk drive (HDD), solid state drive (SSD), etc.) of a source device (e.g., clients 101-102).

Figure 3:
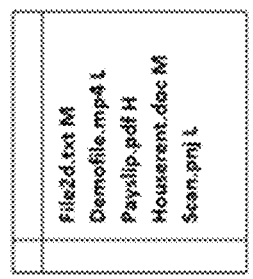
FIG. 3 is a diagram illustrating an example thesis file according to one embodiment.

Referring now to FIG. 3, which is a diagram illustrating an example thesis file, thesis file 210 may include a list of filenames, for example "File2d.txt", "Demofile.mp4", "Payslip.pdf", "Houserent.doc", "Scan.pnj", etc., with corresponding backup criticalities or critical levels (e.g., "H"—high, "M"—medium, or "L"—low) associated with the filenames. In one embodiment, a weighted value may be assigned to each criticality from the thesis file 210. For example, the most critical data (high-level criticality) may be assigned with a value of 3, medium-level critical data may be assigned with a value of 2, and the least critical data (low-level criticality) may be assigned with a value of 1. In one embodiment, the assigned weighted value may be stored in thesis file 210.

Referring back to FIG. 2, Euclidean distance calculator 132 may calculate a Euclidean distance of each file (e.g., each consecutive file in a queue) to a next immediate or consecutive file at a source device (e.g., clients 101-102 of FIG. 1). The Euclidean distance calculation may be modified using the weighted value assigned to the file in order to obtain a dot product of a priority and a sequence at the queue for the file. In this way, the nearest and most critical file (high-level criticality) can be evaluated with respect to a current file to be written first to a target device (e.g., storage system 104 of FIG. 1). After this iteration of the Euclidean distance calculation, the files (or file objects) may be serviced according to the nearest and most critical file at the target device's streams for a write operation. For instance, once the Euclidean distances of the files to be backed up have been calculated at a particular point in time, file sorter 133 may adjust (or sort) the files. For example, file sorter 133 may select the nearest and most critical file based on its calculated Euclidean distance to be serviced by a backup utility (e.g., backup agent 121 of FIG. 1), which may route latch the file for a write operation at the target device.

Figure 4:
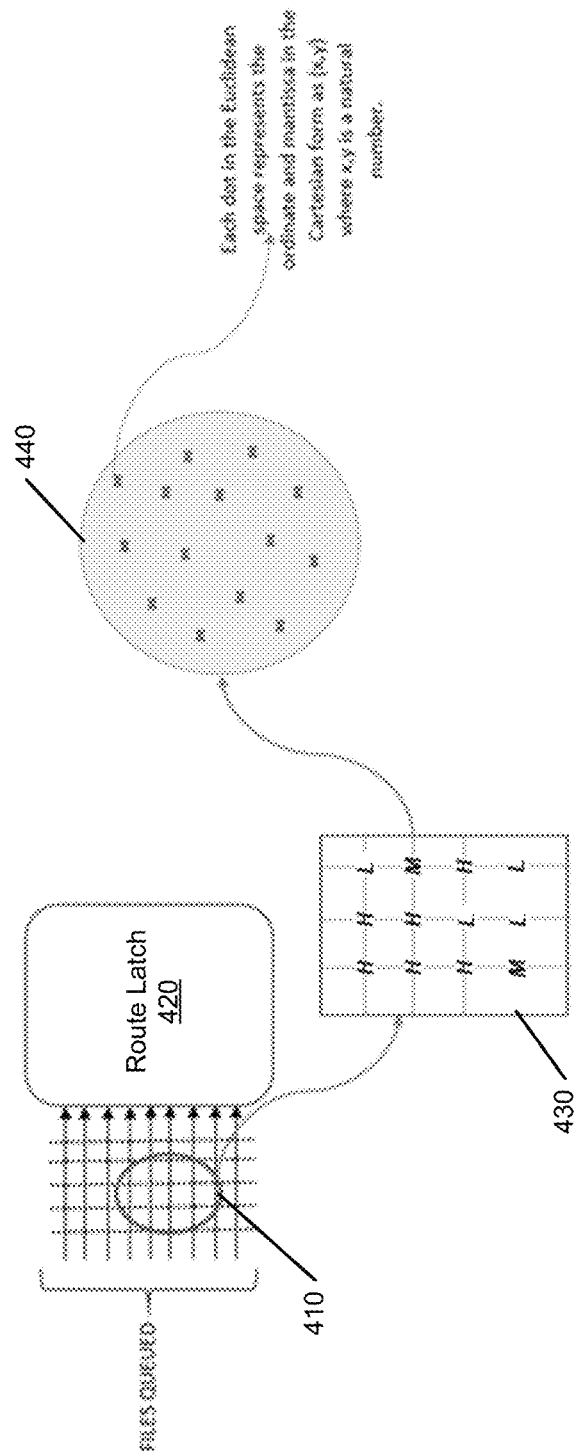
FIG. 4 is a diagram illustrating a derivation of a Euclidean space according to one embodiment.

FIG. 4 is a diagram illustrating a derivation of a Euclidean space according to one embodiment. The Euclidean space (as described in more detail herein below) may be used to calculate the Euclidean distance of each file to be backed up. The algorithm of FIG. 4 assumes the placement of the files in a queue 430 as a Euclidean space, where the row-column intersections of the queue 430 and files in the list may be considered as coordinates of the Euclidean space in a Cartesian form.

Referring to FIG. 4, the algorithm begins with a list of files 410 (which may be stored in queue 430 or another data structure) that needs to be processed for backup. A backup criticality or critical level (e.g., "H"—high, "M"—medium, or "L"—low) may be assigned to each file using a file-type analyzer (e.g., analyzer 131 of FIG. 2) and captured in a thesis file, which may be the thesis file shown in FIG. 3. The thesis file may include a filename and corresponding criticality associated with each file. Then, a weighted value corresponding to the criticality (as previously described) may be used to calculate the Euclidean distance between a set of files and a set of consecutive files. The resultant may decide the next immediate file that needs to be serviced by a backup utility to route latch 420 for streaming.

In more detail, consider a set of files in queue 430 as a set $P=\{p_1, p_2, p_3, \ldots, p_n\}$, where $n \in N$ and the next immediate data file set may be denoted by $P'=\{p'_1, p'_2, p'_3, \ldots, p'_n\}$. The weighted values corresponding to the criticality of the files may be denoted by $W=\{w_1, w_2, w_3\}$ and the weighted value of the consecutive file may be a set $W'=\{w'_1, w'_2, w'_3\}$. For any value in Euclidean space 440, a distance in Cartesian form would be given as follows:

$$E_d = \sqrt{\sum_{i,j=1}^{n} |(p_i - p'_j)|^2} \text{ where } \{i,j,k,m \in N\}$$

The derived row-column representation in queue 430 that stores the files may be assumed as Euclidean space 440 with dots. Each dot in Euclidean space 440 may represent the coordinate and mantissa in Cartesian form as (x, y), where x, y are natural numbers.

In this case, the weighted values corresponding to the critical files are considered. Thus, the values from the set of W and W' may be considered and the Euclidean points may be modified to have a dot product of the sequence in queue 430 and the weighted value of each of the files. Accordingly, the Euclidean distance may now be represented as follows:

$$E_{dw} = \sqrt{\sum_{i,j=1}^{n} |(p_i \cdot w_k - p'_j \cdot w_m)|^2} \text{ where } \begin{Bmatrix} i, j, k, m \in N \\ 0 < k < 4 \\ 0 < m < 4 \end{Bmatrix}$$

Since the batch of files are considered, the equation may be modified to consider the batch being processed. Hence, the equation can be as follows:

$$E_{dw} = \sqrt{\sum_{i,j=1}^{n} \left|\frac{1}{n}(p_i \cdot w_k - p'_j \cdot w_m)\right|^2} \text{ where } \begin{Bmatrix} i, j, k, m \in N \\ 0 < k < 4 \\ 0 < m < 4 \end{Bmatrix}$$

The numerical 'n' denotes the current batch that is being considered and the distance has to be considered for a particular file, which is a single entity. Thus, the equation is divided by number of files per batch.

With the modified Euclidean distance, each iteration of the Euclidean distance can result in a nearest possible file, which corresponds to the most critical file. This can be repeated and determined for each weighted value of criticality and every file in the queue 430 for consecutive instant of time, thereby resulting in a prioritization with respect to the critical file.

Figure 5:
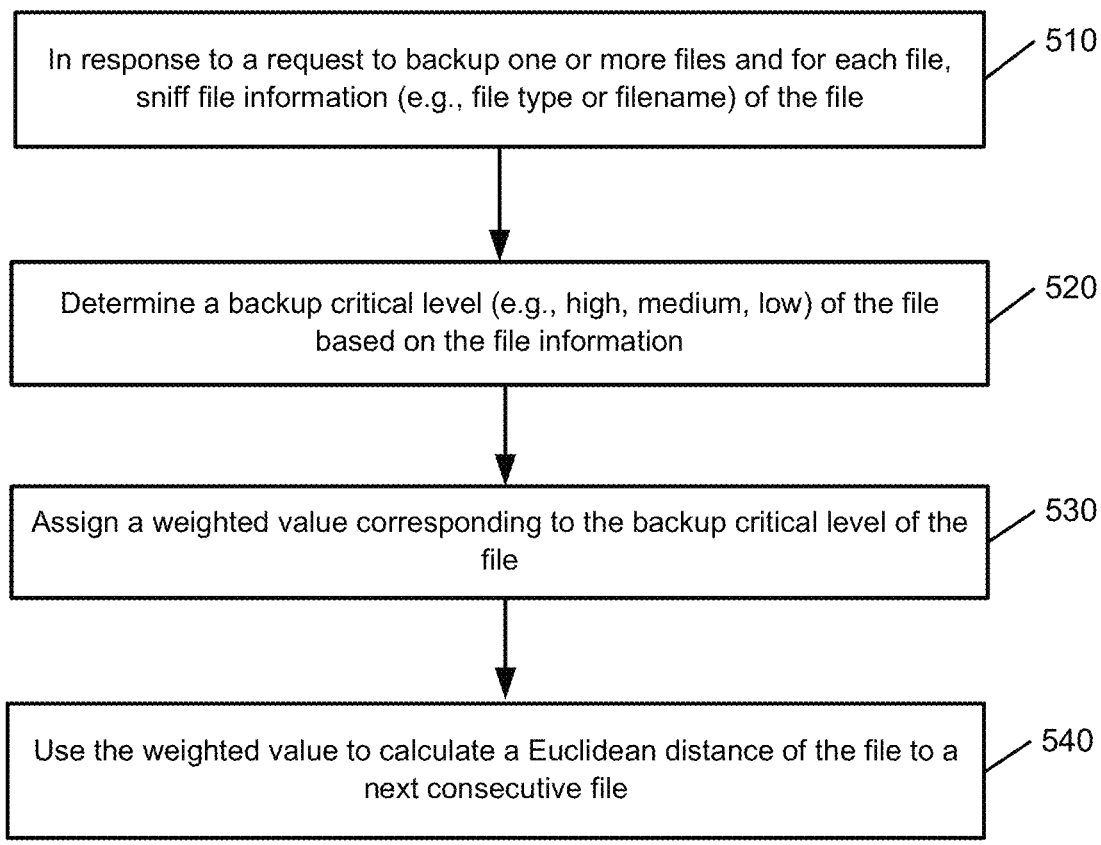
FIG. 5 is a flow diagram illustrating a method for file level prioritization during a data backup operation according to one embodiment.

FIG. 5 is a flow diagram illustrating a method for file level prioritization during a data backup operation according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by file-type analyzer 131, Euclidean distance calculator 132, file sorter 133, or a combination thereof.

Referring to FIG. 5, at block 510, in response to a request to backup one or more files and for each file, the processing logic sniffing file information (e.g., file type or filename) of the file. At block 520, the processing logic determines a backup critical level (e.g., high, medium, low) of the file based on the file information. At block 530, the processing logic assigns a weighted value corresponding to the backup critical level of the file. At block 540, the processing logic uses the weighted value to calculate a Euclidean distance of the file to a next consecutive file.

In the foregoing embodiments of the invention, file sets can be prioritized based on the criticality and time during backups. Due to file level prioritization, if the critical file is written to the target device (e.g., storage system 104 of FIG. 1) first, data loss may be encountered to some extent. Moreover, RPO for critical data paths can be prioritized first, thereby leading to better RPO. Also, file criticality association is recorded in a thesis file. Due to file level prioritization, the solution ensures service-level agreement (SLA) metrics are further optimized and honored for customers.

Figure 6:
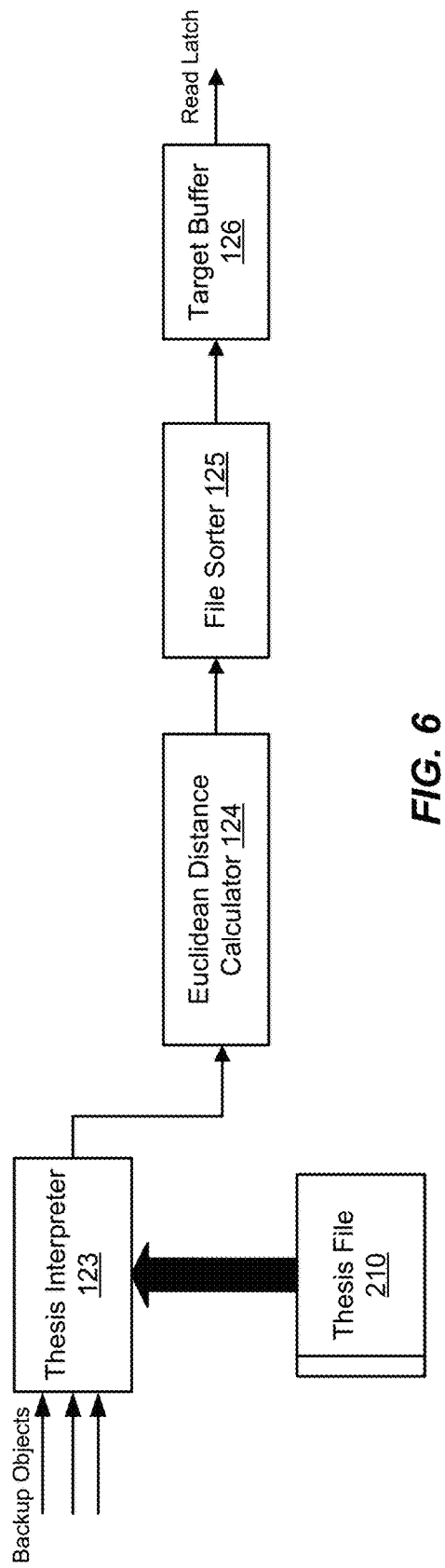
FIG. 6 is a block diagram illustrating another file level data prioritization system according to one embodiment.

FIG. 6 is a block diagram illustrating another file level data prioritization system according to one embodiment. Referring to FIG. 6, the system includes a thesis interpreter 123, Euclidean distance calculator 124, file sorter 125, and target buffer 126 (as previously described).

Thesis interpreter 123 may evaluate a priority of each file to be restored and present the file to Euclidean distance calculator 124. For example, interpreter 123 may parse the file information (e.g., filename) and corresponding criticality (or critical value) of each file from thesis file 210 (i.e., retrieve the file information and criticality of each file from thesis file 210), and evaluate a final priority weighted value (or weightage) for each file in backed-up data objects (e.g., data objects 112-113 of FIG. 1). Thesis file 210 may be presented or sent to the target device (e.g., storage system 104 of FIG. 1) on an on-demand basis when a restore request is initiated by a recovery or restore agent (e.g., restore agent 122 of FIG. 1). As previously described, thesis file 210 may include a list of files that were backed up and corresponding critical levels assigned to the files.

Euclidean distance calculator 124 may calculate the Euclidean distance of each file and its consecutive file (which may be stored in a queue or any other data structure) at the target device. The Euclidean distance calculation may be modified using a weighted value from thesis interpreter 123 in order to obtain a dot product of a priority and a sequence at the queue for that file. In this way, the nearest and most critical file may be evaluated with respect to a current file to be read first from the backup objects on the target device. After the iteration of the Euclidean distance calculation, data streams may be allocated according to the nearest and critical files from the target device to data streams for read operations. Once the Euclidean distance of each file and its consecutive file are calculated in all available data streams from the target device at a particular point in time, file sorter 125 may adjust or sort the files at the streams. For example, file sorter 125 may select the nearest and critical file to be read latched to the recovery agent based on the Euclidean distance of each file. The sorted files may be routed to target buffer 125 (e.g., a read buffer) in a concurrent fashion within the available streams for read operations. Target buffer 126 may further route the sorted files to be restore latched and recovered at a target site (e.g., clients 101-102 of FIG. 1).

Figure 7:
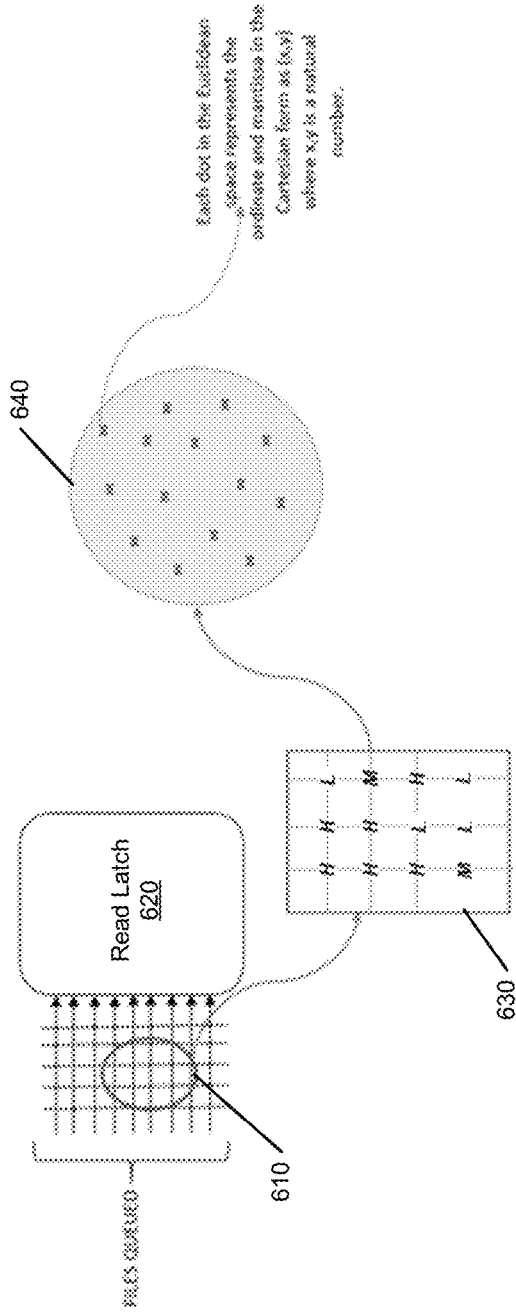
FIG. 7 is a diagram illustrating another derivation of a Euclidean space according to one embodiment.

FIG. 7 is a diagram illustrating another derivation of a Euclidean space according to one embodiment. The Euclidean space (as described in more detail herein below) may be used to calculate the Euclidean distance of each file to be recovered or restored. The algorithm of FIG. 7 assumes the placement of the files in a queue 630 as a Euclidean space, where the row-column values of the queue 630 at the target device may be considered as coordinates of the Euclidean space in a Cartesian form.

Referring to FIG. 7, the algorithm begins with the reading of thesis file information from a thesis file (e.g., thesis file 210 of FIG. 6) to check the criticality of the files. Then the weighted value corresponding to the criticality may be used to calculate the Euclidean distance between the current file and the consecutive ones in the queue 630, and the resultant may decide the next immediate file that has to be read latched at that instant of time. In more detail, consider the files in the queue 630 as a set $P=\{p_1, p_2, p_3, \ldots p_n\}$ where, $n \in N$ and the next immediate file set is denoted by $P'=\{p'_1, p'_2, p'_3, \ldots, p'_n\}$. The weighted value corresponding to the criticality of the data may be denoted as $W=\{w_1, w_2, w_3\}$ and the weighted value of the consecutive file may be denoted as a set $W'=\{w'_1, w'_2, w'_3\}$. For any value in the Euclidean space, the distance in a Cartesian form may be given as follows:

$$E_d = \sqrt{\Sigma_{i,j=1}^n |(p_i - p'_j)|^2} \text{ where } \{i,j,k,m \in N\}$$

Here, the weighted values corresponding to the critical data packets are considered. Thus, the values from the set of W and W' may also be considered and the Euclidean points may be modified to obtain a dot product of the sequence in queue 630 and the weighted value of each of the files. Accordingly, the Euclidean distance may be represented as follows:

$$E_{dw} = \sqrt{\Sigma_{i,j=1}^n |(p_i \cdot w_k - p'_j \cdot w_m)|^2} \text{ where } \begin{cases} i, j, k, m \in N \\ 0 < k < 4 \\ 0 < m < 4 \end{cases}$$

Since the batch of files is considered, the equation may be modified to consider the batch being processed. Hence, the equation may be as below:

$$E_{dw} = \frac{1}{n}\sqrt{\Sigma_{i,j=1}^n \left|\frac{1}{n}(p_i \cdot w_k - p'_j \cdot w_m)\right|^2} \text{ where } \begin{cases} i, j, k, m \in N \\ 0 < k < 4 \\ 0 < m < 4 \end{cases}$$

The numerical 'n' denotes the current batch being considered and the distance has to be considered for a particular file, which is a single entity. Accordingly, the equation is divided by a number of files per batch.

With the modified Euclidean distance, each iteration of the Euclidean distance results in a nearest possible file corresponding to the most critical file. This may be repeated and determined for each weighted value of criticality and every file from the target device for consecutive instant of time, thereby resulting in a prioritization with respect to the critical file.

Figure 8:
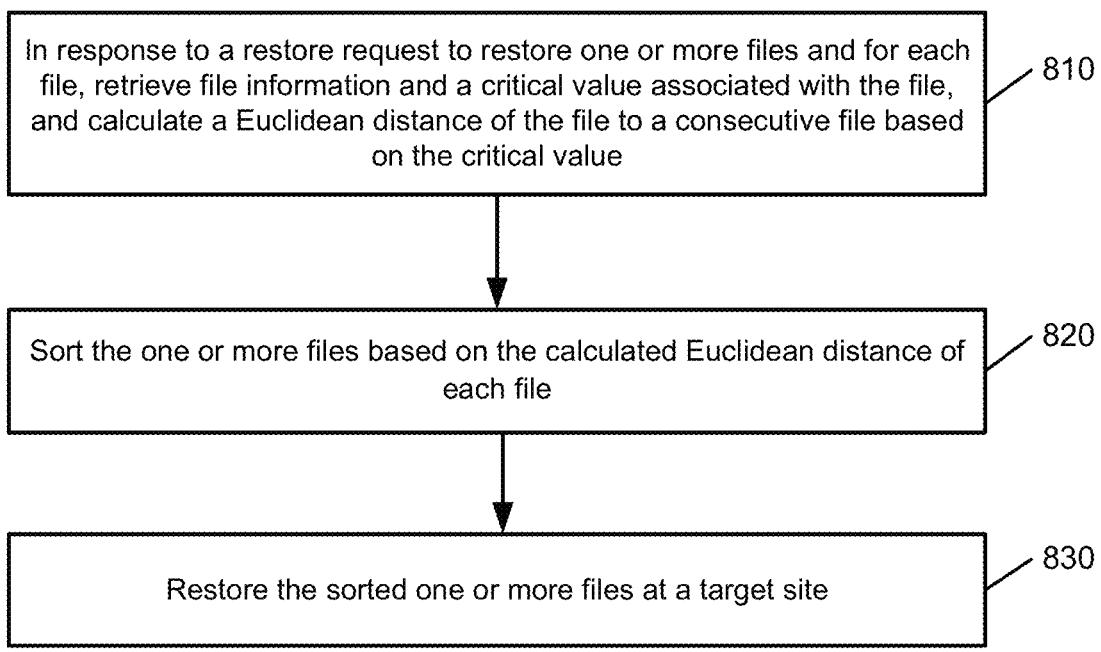
FIG. 8 is a flow diagram illustrating a method for file level prioritization during a data restore operation according to one embodiment.

FIG. 8 is a flow diagram illustrating a method for file level prioritization during a data restore or recovery operation according to one embodiment. Process 800 may be performed by processing logic that includes hardware (e.g. circuitry, dedicated logic, etc.), software (e.g., embodied on a non-transitory computer readable medium), or a combination thereof. For example, process 800 may be performed by restore agent 122, thesis interpreter 123, Euclidean distance calculator 124, file sorter 125, or a combination thereof.

Referring to FIG. 8, at block 810, in response to a restore request to restore one or more files and for each file, the processing logic retrieves file information (e.g., file type or filename) and a critical value (e.g., high, medium, low) associated with the file, and calculates a Euclidean distance of the file to a consecutive file based on the critical value. At block 820, the processing logic sorts file(s) based on the calculated Euclidean distance of each file. At block 830, the processing logic restores the sorted file(s) at a target site (e.g., clients 101-102).

In the foregoing embodiments of the invention, file sets can be prioritized based on the weighted values (or weight-age) of each file and time of arrival of the file. Due to priority sorting, if the critical file is restored to a source device first (e.g., clients 101-102 of FIG. 1) first, data loss can be encountered to some extent. Moreover, RPO for critical data paths can be prioritized first, thereby leading to better RPO. Also, file details and its corresponding critical value are recorded in a thesis file. Due to file priority sorting at the target device, the solution ensures SLA metrics are further optimized and honored for customers.

Note that some or all of the components as shown and described above (e.g., components 123-126 and 131-133 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
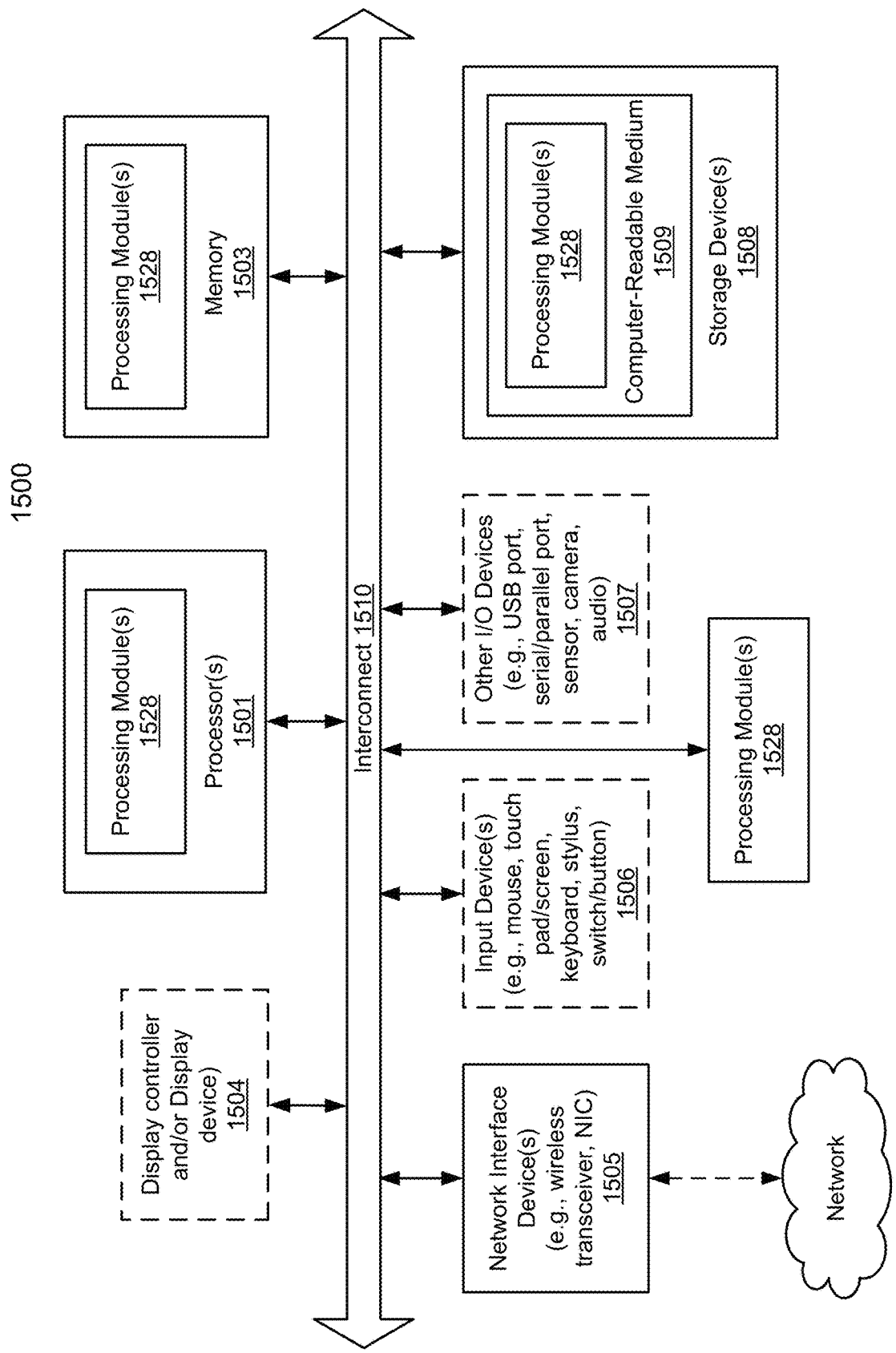
FIG. 9 is a block diagram illustrating a data processing system according to one embodiment.

FIG. 9 is a block diagram illustrating an example of a data processing system which may be used with one embodiment. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 123-126 and 131-133 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for file level prioritization during a data backup operation, comprising:
   in response to a request to backup one or more files and for each file,
   sniffing file information of the file;
   determining a backup critical level of the file based on the file information;
   assigning a weighted value corresponding to the backup critical level of the file; and
   using the weighted value to calculate a Euclidean distance of the file to a next consecutive file.

2. The method of claim 1, further comprising storing the file information and the backup critical level of each file in a thesis file.

3. The method of claim 2, further comprising sorting the one or more files based on the calculated Euclidean distance of each file.

4. The method of claim 3, wherein sorting the one or more files comprises selecting a nearest and most critical file to be backed up based on the calculated Euclidean distance of the nearest and most critical file to a current file.

5. The method of claim 4, further comprising backing up the sorted one or more files in accordance with the respective Euclidean distances of the sorted one or more files.

6. The method of claim 1, wherein using the weighted value to calculate the Euclidean distance of the file comprises obtaining a dot product of the weighted value and a sequence of the file in a queue.

7. The method of claim 1, wherein the file information comprises a file type or a filename.

8. A non-transitory machine-readable medium having instructions stored therein, which when executed by a processor, cause the processor to perform operations, the operations comprising:
   in response to a request to backup one or more files and for each file,
   sniffing file information of the file;
   determining a backup critical level of the file based on the file information;

assigning a weighted value corresponding to the backup critical level of the file; and using the weighted value to calculate a Euclidean distance of the file to a next consecutive file.

9. The non-transitory machine-readable medium of claim 8, wherein the operations further comprise storing the file information and the backup critical level of each file in a thesis file.

10. The non-transitory machine-readable medium of claim 9, wherein the operations further comprise sorting the one or more files based on the calculated Euclidean distance of each file.

11. The non-transitory machine-readable medium of claim 10, wherein sorting the one or more files comprises selecting a nearest and most critical file to be backed up based on the calculated Euclidean distance of the nearest and most critical file to a current file.

12. The non-transitory machine-readable medium of claim 11, wherein the operations further comprise backing up the sorted one or more files in accordance with the respective Euclidean distances of the sorted one or more files.

13. The non-transitory machine-readable medium of claim 8, wherein using the weighted value to calculate the Euclidean distance of the file comprises obtaining a dot product of the weighted value and a sequence of the file in a queue.

14. The non-transitory machine-readable medium of claim 8, wherein the file information comprises a file type or a filename.

15. A data processing system, comprising:

a processor; and a memory coupled to the processor to store instructions, which when executed by the processor, cause the processor to perform operations, the operations including:

in response to a request to backup one or more files and for each file, sniffing file information of the file;

determining a backup critical level of the file based on the file information;

assigning a weighted value corresponding to the backup critical level of the file; and using the weighted value to calculate a Euclidean distance of the file to a next consecutive file.

16. The data processing system of claim 15, wherein the operations further include storing the file information and the backup critical level of each file in a thesis file.

17. The data processing system of claim 16, wherein the operations further include sorting the one or more files based on the calculated Euclidean distance of each file.

18. The data processing system of claim 17, wherein sorting the one or more files comprises selecting a nearest and most critical file to be backed up based on the calculated Euclidean distance of the nearest and most critical file to a current file.

19. The data processing system of claim 18, wherein the operations further include backing up the sorted one or more files in accordance with the respective Euclidean distances of the sorted one or more files.

20. The data processing system of claim 15, wherein using the weighted value to calculate the Euclidean distance of the file comprises obtaining a dot product of the weighted value and a sequence of the file in a queue.

21. The data processing system of claim 15, wherein the file information comprises a file type or a filename.

* * * * *